July 31, 1928.
R. P. BERNHARDT ET AL
1,678,761
AXLE GAUGE
Filed Dec. 8, 1926
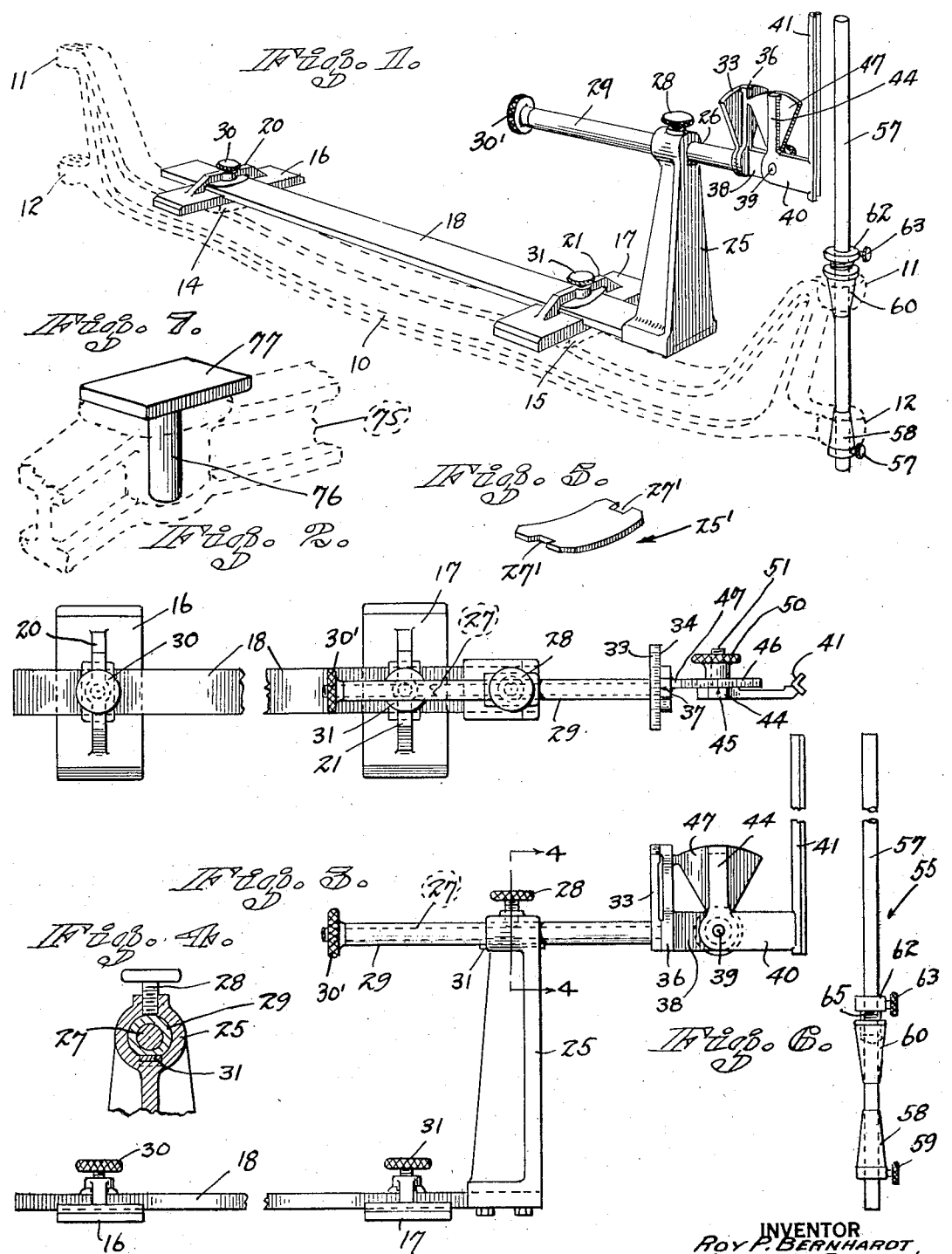
INVENTOR
ROY P. BERNHARDT
VICTOR D. BLACK, JR.,
BY
ATTORNEYS.

Patented July 31, 1928.

1,678,761

UNITED STATES PATENT OFFICE.

ROY P. BERNHARDT AND VICTOR D. BLACK, JR., OF LIVERMORE, CALIFORNIA.

AXLE GAUGE.

Application filed December 8, 1926. Serial No. 153,412.

This invention relates to axle gauges and is particularly useful in gauging the alignment of axles on automobiles equipped with four-wheel brakes.

An object of our invention is the provision of a novel and efficient article of the character described.

With the foregoing object in view, together with such other objects or advantages as may subsequently appear, this invention resides in the construction and arrangement of parts hereinafter described and claimed, and illustrated in the accompanying drawings, in which Figure 1 is a perspective view of our improved gauge shown in relation to an automobile axle, Figure 2 is a plan view of the gauge proper shown in Figure 1, Figure 3 is a side elevation of the gauge proper, Figure 4 is a vertical section taken on line 4—4 of Figure 3, Figure 5 is a perspective view of a spring member employed in the gauge, Figure 6 is an elevation of mechanism employed with the gauge proper, and Figure 7 is a perspective view shown in dotted lines, a fragment of a Ford axle and in full lines a device employed in connection therewith when gauging with our device.

Referring to the drawings for a more detailed description thereof, the numeral 10 indicates an automobile axle shown in dotted lines in Figure 1. The axle is provided at its ends with vertical upper and lower bearings 11 and 12 respectively. The axle shown is provided on its upper surface with flat upper surfaced members 14 and 15 on which respectively rest plates 16 and 17 which are part of the gauge structure.

The plates 16 and 17 are transversely recessed on their upper surfaces to receive an elongated bar 18. Bridge members 20 and 21 span the recesses of the plates 16 and 17 respectively.

Concave-convex spring plate members 25' of the type shown in Figure 5 are provided with end notches 27'; and these spring members are placed on the upper surface of the bar 18, one under each bridge, with their convex sides uppermost and with their end notches 27' engaging the end portions of the bridge.

Screws 30 and 31 respectively pass thru the horizontal portions of the bridges 20 and 21 and their lower ends are adapted to bear on the spring plate members 25'. The adjustment of the screws serve to hold the bar 18 in any desired position relative to the plates 16 and 17.

Rising from one end of the bar and at a right angle to the latter is a support 25 provided at its upper end with a transverse aperture 26, thru which slidably passes a tubular member 29, which is parallel to the bar 18. The member 29 is held against rotation by having its bottom face flattened and by riding on a flat plate 31' and it may be fastened in any desired position by a set screw 28. Inside the tubular member 29 is a rotatable rod 27, which extends beyond the left end of the tube 29 and is threaded so that a nut 30' may engage it and bear up against the end of the rod 29 for tightening.

Secured to an end of the tubular member 29 is a vertical and transversely disposed sector-shaped member 33 on the arcuate top of which is marked a scale 34, as shown in Figure 2.

An indicating member 36, secured to the rod 27, bears an arrow 37 pointing toward the scale 34 on the member 33 whereby degrees or other arbitrary markings on the member 33 may be read when the rod 27 is rotated.

A bar 38 extends rearwardly from the bottom of indicating member 36 and to the end of this bar 38 is pivotally secured at 39 a bar 40, to the outer end of which is secured an upright member 41.

Integral with the bar 40 and rising therefrom is another indicating member 44, having an arrow 45 thereon, which is used in reading a scale 46 placed on the arcuate face of a sector-shaped member 47, which is secured to the indicating member 36 and at its bottom to the bar 38.

A nut 50 on a screw 51 functions to tighten the indicating member 44 to the sector-shaped member 47.

A member 55 shown in Figure 6, is used with the described mechanism or gauge proper. The member 55 comprises a rod 57 on which is mounted a lower cone 58 tightly secured to the rod by means of a set screw 59. The cone 58 as shown in Figure 1 is held in the bearing 12 of the axle. An adjustable cone 60 is slidably disposed on the rod 57. The cone 60 is adapted to be held in the bearing 11 of the axle as shown in Figure 1. A collar 62 provided with a set screw 63 encircles the rod 57 and is adapted to be held in position on the rod by means of the set screw 63. Integrally with the collar 62 and extending therebelow and surrounding the rod 57 is a hollow exteriorly threaded screw 65, which threadedly engages the interior of the cone 60.

It will be seen from Figure 1 that in the use of the gauge the straight cone-bearing rod 57 rises above the bearing 11, and rises to a height of the vertical member 41 shown in Figure 1 as being in spaced relation to the cone-bearing rod. When it is desired to gauge the position of the cone-bearing rod 57 the tubular member 29 is pushed toward it until the rod 41 comes into contact with it, the rod 41 having a concave face corresponding to the rod 57. The upright member 41 can be made to contact thruout its length with the upper portion of the rod 57 by reason of the fact that the indicating member 36 is pivoted relative to the sector-shaped member 33, and also by virtue of the fact that the bar 40 is pivotally mounted at 39 at right angles to the pivot of the indicating member 36; in other words, the member 41 may be moved in two vertical planes which are at right angles to each other.

When the rod 41 is fully in contact with the rod 57 the reading may be taken on the scales 33 and 46 whereby it may be known how much the bearings 11 and 12 may be adjusted.

Referring to the Figure 7, the numeral 75 indicates a Ford axle shown in dotted lines. The axle has a vertical aperture into which fits a stem 76 secured at a right angle to a flat plate 77 on which may rest the gauge; a similar device is placed in the aperture adjacent the other end of the axle.

While we have described one embodiment of our invention, modifications thereof may be readily devised without departing from the spirit of our invention, and it is to be understood that such modifications come within the scope of the appended claims.

We claim:

1. In a gauge of the character described, a supported member having a sector mounted transversely at one end thereof, a second member mounted co-axially with and revolvable relative to the first member and having a pointer movable over said sector and a second sector co-planar with the second member and a third member pivoted to the second member having a pointer movable over the second sector and having a gauge element associated therewith.

2. In a gauge of the character described, a rod adapted to pass through two alined bearings at the end of an axle and having a fixed conical seat adapted to rest in one of the bearings, a collar on said rod and a second conical seat threaded on said collar and adapted to be backed into the other bearing for aligning the rod with the bearings.

3. A gauge comprising a rod having means associated therewith for aligning the same relative to the bearings at one end of an axle, a gauge member, means for supporting the same in juxtaposition to said rod made to allow of universal adjustment of the gauge member and including means for holding the gauge member in adjusted position, and means allowing the member to be advanced toward the rod.

4. A gauge comprising a rod having means associated therewith for aligning the same relative to the bearings at one end of an axle, a gauge member, means for supporting the same in juxtaposition to said rod made to allow of universal adjustment of the gauge member and including means for holding the gauge member in adjusted position, and means indicating the angular position of said member.

5. A gauge comprising a rod having means associated therewith for aligning the same relative to the bearings at one end of an axle, a gauge member, means supporting the same in juxtaposition to said rod, the said means being adjustable so as to allow the member to be paralleled with the rod, and means allowing the member to be advanced toward the rod.

ROY P. BERNHARDT.
VICTOR D. BLACK, Jr.